(12) United States Patent
Zhai

(10) Patent No.: US 10,722,023 B2
(45) Date of Patent: Jul. 28, 2020

(54) MULTIFUNCTIONAL BROOM WITH A ROTATABLE HEAD

(71) Applicant: SUZHOU WOTESHEN IMPORT & EXPORT CO., LTD., Suzhou (CN)

(72) Inventor: Yi Zhai, Suzhou (CN)

(73) Assignee: SUZHOU WOTESHEN IMPORT & EXPORT CO., LTD., Suzhou (CN)

( * ) Notice: Subject to any disclaimer, the term of this patent is extended or adjusted under 35 U.S.C. 154(b) by 43 days.

(21) Appl. No.: 16/228,440

(22) Filed: Dec. 20, 2018

(65) Prior Publication Data
US 2020/0069041 A1    Mar. 5, 2020

(30) Foreign Application Priority Data

Sep. 5, 2018 (CN) .......................... 2018 1 1033014

(51) Int. Cl.
| A46B 15/00 | (2006.01) |
| A01G 20/43 | (2018.01) |
| A46B 9/10 | (2006.01) |
| A46B 9/06 | (2006.01) |
| A46B 5/00 | (2006.01) |

(52) U.S. Cl.
CPC .............. *A46B 15/00* (2013.01); *A01G 20/43* (2018.02); *A46B 5/0083* (2013.01); *A46B 9/06* (2013.01); *A46B 9/10* (2013.01); *A46B 2200/302* (2013.01)

(58) Field of Classification Search
CPC .......... A01G 20/43; A46B 9/10; A46B 15/00; A46B 2200/302; A46B 5/0083; A46B 9/06
See application file for complete search history.

(56) References Cited

U.S. PATENT DOCUMENTS

| 3,668,850 A | * | 6/1972 | Horkey ...................... A01D 7/04 56/400.04 |
| 4,796,324 A | * | 1/1989 | Sartori .................. A46B 5/0054 15/144.1 |
| 4,843,667 A | * | 7/1989 | Hanly, Sr. ................ A01B 1/20 7/114 |
| 5,384,930 A | * | 1/1995 | Uno ...................... A46B 5/0062 116/212 |
| 6,032,447 A | * | 3/2000 | Shelton ..................... A01D 7/10 15/176.6 |

(Continued)

FOREIGN PATENT DOCUMENTS

| CN | 104970746 B | * | 5/2018 | |
| JP | 3221812 U | * | 6/2019 | ............ A01D 11/06 |

*Primary Examiner* — Marc Carlson
(74) *Attorney, Agent, or Firm* — SZDC Law P.C.

(57) ABSTRACT

The present invention relates to a broom, and in particular to a multifunctional broom with a rotatable head. According to the present invention, an brush head and a rake tooth are provided on a broom head. The rake tooth can be used for cleaning of regions such as outdoor grounds and lawns, and the brush head can be used for indoor cleaning. Moreover, the rake tooth can be extended out of or retracted into the broom head through the first telescopic mechanism. The broom of the present invention is very simple and convenient to use and provides more thorough cleaning. The first telescopic mechanism enables automatic telescoping depending on various conditions of ground, thereby providing more thorough cleaning and being more convenient and efficient (FIG. 1).

10 Claims, 3 Drawing Sheets

(56) References Cited

U.S. PATENT DOCUMENTS

| | | | |
|---|---|---|---|
| 2004/0034955 A1* | 2/2004 | Townsend | A46B 5/0058 |
| | | | 15/144.1 |
| 2009/0172903 A1* | 7/2009 | Vosbikian | A46B 5/0075 |
| | | | 15/172 |
| 2013/0247533 A1* | 9/2013 | Zupan | A01D 11/06 |
| | | | 56/400.04 |
| 2017/0172288 A1* | 6/2017 | Bart | A46B 7/026 |
| 2018/0125226 A1* | 5/2018 | Weber | A46B 17/02 |
| 2019/0038012 A1* | 2/2019 | Alvarez | A46D 3/08 |
| 2019/0059212 A1* | 2/2019 | Njenga | A01D 11/06 |
| 2019/0269292 A1* | 9/2019 | Taboh | B08B 1/005 |

\* cited by examiner

MULTIFUNCTIONAL BROOM WITH A ROTATABLE HEAD

This application claims priority to Chinese Patent Application No.: 201811033014.8, filed on Sep. 5, 2018, which is incorporated by reference for all purposes as if fully set forth herein.

FIELD OF THE INVENTION

The present invention relates to a broom, and in particular to a multifunctional broom with a rotatable head.

BACKGROUND OF THE INVENTION

Brooms are necessary articles for daily life used mainly for clearing away the rubbish and dust. With technical development, brooms have been designed to be increasingly user-friendly and have increasingly diversified functions. Existing brooms are usually provided with bristles only at the head. A broom with such a structure can barely provide thorough cleaning. Also, during cleaning some rough regions such as outdoor grounds and lawns, the broom head is prone to wear-out. Besides, such a broom cannot remove relatively heavy wastes such as rubble and provides undesirable outdoor cleaning.

SUMMARY OF THE INVENTION

An object of the present invention is to provide a multifunctional broom with a rotatable head capable of automatic telescoping depending on various conditions of ground and providing more thorough cleaning. Such a broom is more convenient and efficient to clean both the indoor and outdoor floor.

In order to achieve the object mentioned above, the present invention adopts technical solutions as follows.

A multifunctional broom with a rotatable head comprises a broom head and a broom handle mounted on the broom head. One or more brush heads are provided on a baseplate of the broom head. A rake tooth is also provided on the broom head. One end of the rake tooth is provided with a rake hook and the other end of the rake tooth extends into the broom head and is connected to the broom head via a first telescopic mechanism. The first telescopic mechanism drives the rake tooth to extend out of or retract into the broom head.

As a further improvement of the present invention, the brush head comprises a bristle, a spring, a pin rod. A connection plate is arranged inside the broom head parallel to the baseplate. The pin rod passes between the baseplate and the connection plate. The spring is sleeved over the pin rod. The bristle is fixedly connected to one end of the pin rod. A stopper is provided on the pin rod to prevent the pin rod from being disengaged from the baseplate.

As a further improvement of the present invention, the first telescopic mechanism comprises a press plate, a first spherical bearing pair, a first adjustment rod, and a first adjustment assembly. The press plate is slidably arranged in a chute on an inner wall of the broom head parallel to the baseplate. The rake tooth is fixedly connected to the press plate. The first adjustment rod is connected to the press plate through the first spherical bearing pair. The adjustment assembly is arranged on the broom handle. The first adjustment assembly drives the first adjustment rod to move along the broom handle.

As a further improvement of the present invention, the first adjustment assembly comprises a first adjustment ring and a first adjustment plate. The first adjustment rod is connected to the first adjustment plate and the first adjustment ring is engaged threadedly with the first adjustment plate. And when the first adjustment ring is turned, the first adjustment plate moves along the broom handle and thus drives the first adjustment rod to move.

As a further improvement of the present invention, the broom further comprises a baffle plate passing through the baseplate. The rake tooth passes through the baffle plate. A stopping component is provided on each end of the baffle plate to prevent the baffle plate from being disengaged from the baseplate.

As a further improvement of the present invention, a clipping body with a U-shaped structure is provided on the press plate. A positioning rib that matches the clipping body is provided on the stopping component.

As a further improvement of the present invention, the rake tooth is provided with a supporting component of a height slightly higher than that of the rake hook for supporting the brush head. The supporting component comprises a bracket that is provided with a supporting ring. The brush head passes through the supporting ring.

As a further improvement of the present invention, the broom further comprises a scraping plate that passes through the baseplate. A guiding slot that matches the scraping plate is provided inside the broom head. One end of the scraping plate is connected to a second telescopic mechanism. The second telescopic mechanism drives the scraping plate to move.

As a further improvement of the present invention, the second telescopic mechanism comprises a second spherical bearing pair, a second adjustment rod, and a second adjustment assembly. The second adjustment rod is connected to the scraping plate through the second spherical bearing pair. The second adjustment assembly is connected to the second adjustment rod. The second adjustment assembly drives the second adjustment rod to move along the broom handle.

As a further improvement of the present invention, the second adjustment assembly comprises a second adjustment ring and a second adjustment plate. The second adjustment rod is connected to the second adjustment plate and the second adjustment ring is engaged threadedly with the second adjustment plate. And when the second adjustment ring is turned, the second adjustment plate moves along the broom handle and thus drives the second adjustment rod to move.

As appreciated from the technical solutions described above, a brush head and a rake tooth are provided on the broom head according to the present invention. The rake tooth can be used for cleaning of regions such as outdoor grounds and lawns, and the brush head can be used for indoor cleaning. Moreover, the rake tooth can be extended out of or retracted into the broom head through the first telescopic mechanism. The broom of the present invention is very simple and convenient to use and provides more thorough cleaning. The first telescopic mechanism enables automatic telescoping depending on various consitions of ground, thereby providing more thorough cleaning and being more convenient and efficient to use. The brush head is provided separately, such that when the brush head is worn out, only the brush head instead of the whole broom head needs to be replaced, thereby reducing cost.

DESCRIPTION OF REFERENCE NUMBERS 1. broom handle; 11. first adjustment ring; 12. first adjustment plate; 13. second adjustment ring; 14. second adjustment plate; 15. first adjustment rod; 16. second adjustment rod; 17. first spherical bearing pair; 18. second spherical bearing pair; 2. broom head; 21. rake tooth; 22. rake hook; 23. scraping plate; 3. press plate; 31. clipping body; 32. baffle plate; 33. stopping component; 4. bristle; 41. spring; 42. pin rod; 43. connection plate; 44. bracket; 45. supporting ring.

DETAILED DESCRIPTION OF THE EMBODIMENTS

The present invention will be further described hereinafter with reference to the accompanying drawings and specific embodiments to enable those skilled in the art to better understand the present invention and implement it, but these embodiments are not intended to limit the present invention.

Figure 1:
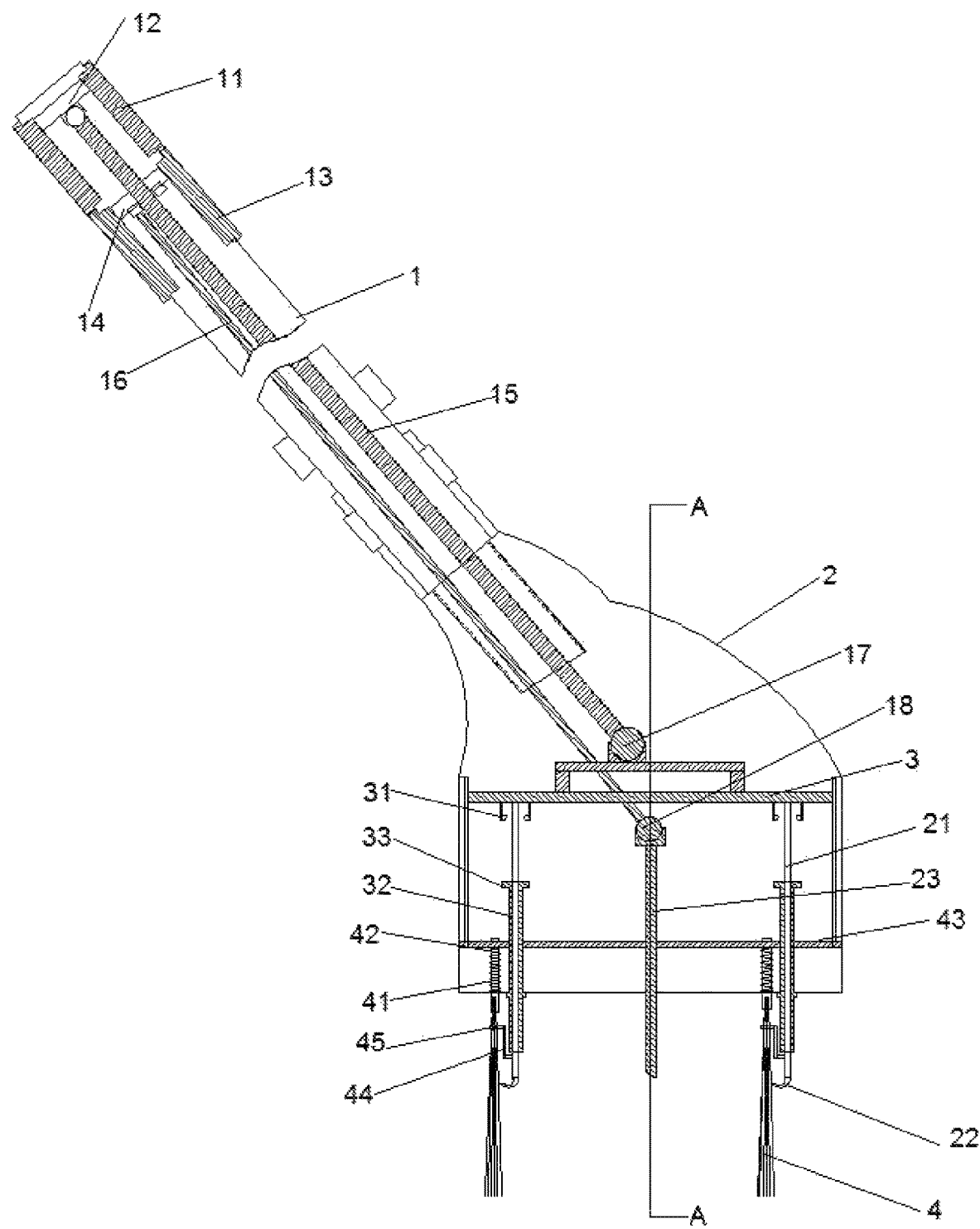
FIG. 1 is a schematic structural view of a multifunctional broom with a rotatable head according to the present invention.
Figure 2:
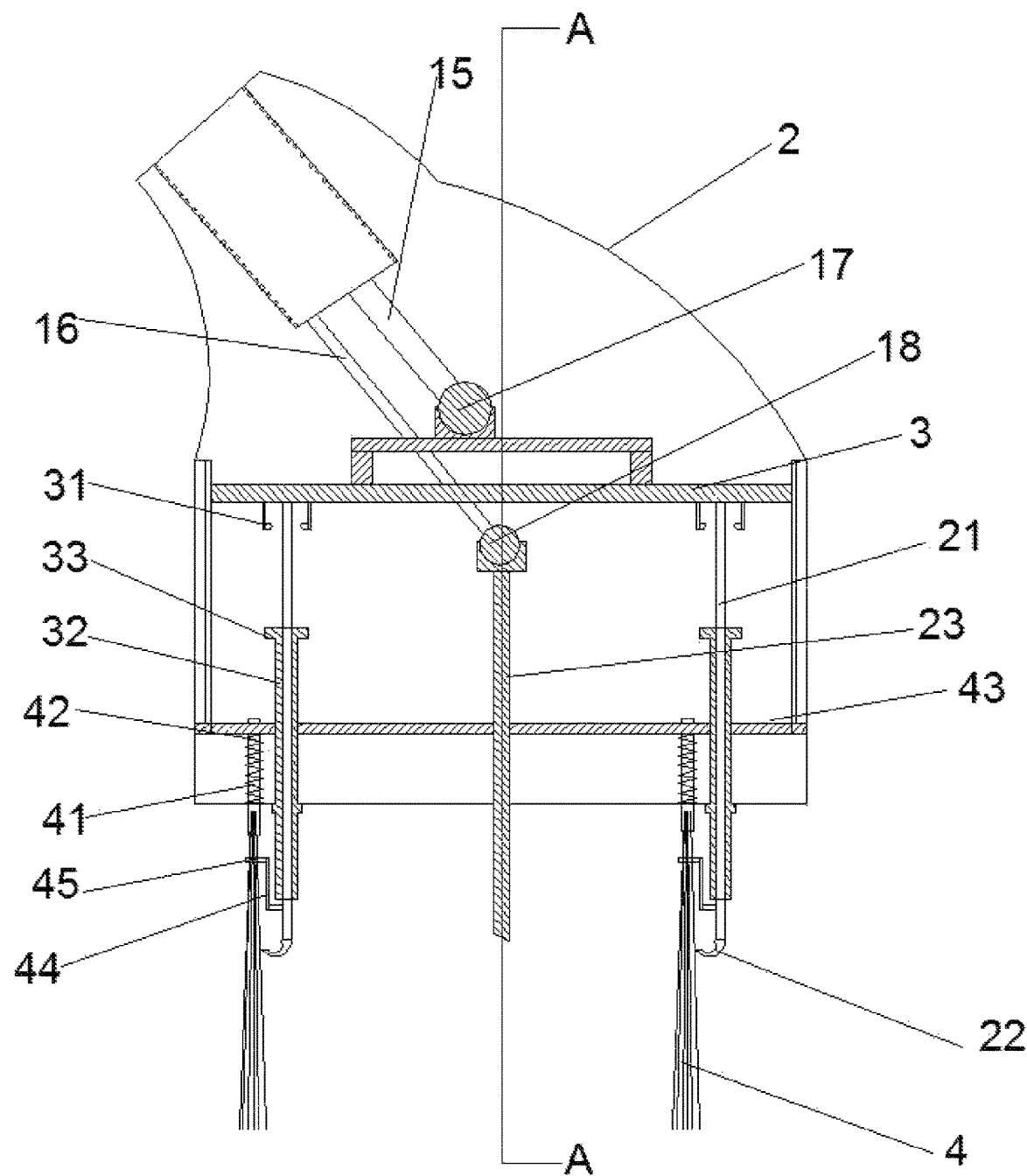
FIG. 2 is a schematic structural view of a broom head according to the present invention.
Figure 3:
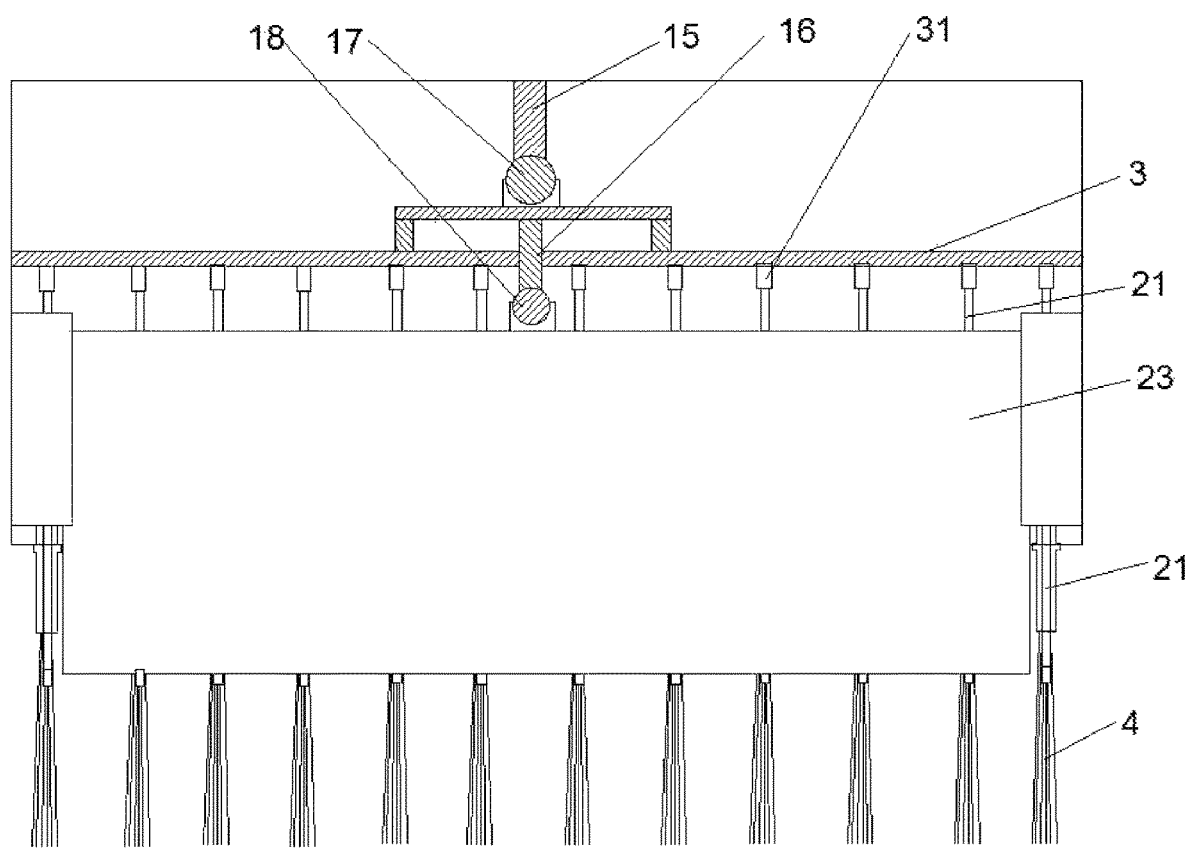
FIG. 3 is a sectional view taken along A-A in FIG. 1.

With reference to FIGS. 1, 2, and 3, a multifunctional broom with a rotatable head comprises a broom head 2 and a broom handle 1 mounted on the broom head 2. In the embodiment, two elastic brush heads are provided on a baseplate of the broom head 2. A rake tooth 21 is provided on the broom head 2. One end of the rake tooth 21 is provided with a rake hook 22 and the other end of the rake tooth 21 extends into the broom head 2 and is connected to the broom head 2 via a first telescopic mechanism. The telescopic mechanism drives the rake tooth 21 to move.

The broom head 2 is at an angle of 0-90° relative to the broom handle 1.

The rake hook 22 is provided with a reception slot for receiving heavy wastes such as rubbles.

The elastic brush heads comprise a bristle 4, a spring, a pin rod 42, and a connection plate 43. The connection plate 43 is arranged inside the broom head 2. The pin rod 42 passes between the baseplate of the broom head 2 and the connection plate 43. The spring is sleeved over the pin rod 42. The bristle 4 is fixedly connected to an end of the pin rod 42. A stopper is provided on the pin rod 42 to prevent the pin rod 42 from being disengaged from the baseplate of the broom head 2.

The pin rod 42 and spring provided on the elastic brush head can be elastically extended or retracted according to the conditions of the ground, such that wear-out to the bristle 4 is alleviated and thus lifetime of the brush is prolonged. Elasticity of the elastic brush head is adjustable and can be adjusted based on the degree of wear-out to individual brushes in order to suite requirements of cleaning for various road surfaces.

The bristle 4 comprises plastic bristles and metal wires. The metal wires are used to reinforce the brush head and enables it to clean outdoor and indoor grounds and lawns more easily and collect heavy stones in the process.

The first telescopic mechanism comprises a press plate 3, a first spherical bearing pair 17, a first adjustment rod 15, and a first adjustment assembly. The press plate 3 is slidably arranged in a chute on an inner wall of the broom head 2. The rake tooth 21 is fixedly connected to the press plate 3. The first adjustment rod 15 is connected to the press plate 3 through the first spherical bearing pair 17. The adjustment assembly is arranged on the broom handle 1. The first adjustment assembly is connected to the first adjustment rod 15 and drives the first adjustment rod 15 to move along the broom handle.

The first adjustment assembly comprises a first adjustment ring 11, a first spherical bearing pair 17, and a first adjustment plate 12. The first adjustment ring 11 is rotatably arranged on the broom handle 1. The first adjustment ring 11 is sleeved on the first adjustment rod. The first adjustment ring 11 is threaded to the first adjustment rod. The first adjustment rod 15 is connected to the first adjustment plate 12 and the first adjustment ring 11 is engaged threadedly with the first adjustment plate 12 and when the first adjustment ring 11 is turned, the first adjustment plate 12 moves along the broom handle 1 and thus drives the first adjustment rod 15 to move.

The first adjustment ring 11 drives the first adjustment plate 12 to move up and down and thus drives the first adjustment rod 15 connected to the first adjustment plate 12 to move up and down. The first adjustment rod 15 is connected to the press plate 3 and drives the press plate 3 to move up and down. In this way, quick switching is enabled between the rake tooth 21 and the elastic brush head. Such a broom has a simple structure, quick switching, and is convenient in use. It is capable of automatic telescoping depending on various conditions of ground, thereby providing more thorough cleaning and being more convenient and efficient.

The broom further comprises a baffle plate 32 passing through the baseplate of the broom head 2. The rake tooth 21 passes through the baffle plate 32. A stopping component 33 is provided on each end of the baffle plate 32 to prevent the baffle plate 32 from being disengaged from the baseplate of the broom head 2.

The baffle plate 32 can effectively prevent the bristle 4 from inclining in one direction and thus effectively maintain the vertical arrangement of the bristle 4, such that force can be applied conveniently in cleaning even after use for a long time. Moreover, the baffle plate 32 can support the rake tooth 21 to maintain the vertical arrangement of the rake tooth 21 and prevent bending, thereby improving stability of the rake tooth 21 in use.

A clipping body 31 of a U-shaped structure is provided on the press plate 3. A positioning rib that matches the clipping body 31 is provided on the stopping component 33.

The clipping body 31 moves downward along with the press plate 3. When the top of the baffle plate 32 is pressed against the baseplate of the broom head 2 by the press plate 3, the clipping body 31 is clipped onto the positioning rib. When the press plate 3 drives the rake tooth 21 to rise, the clipping body 31 drives the baffle plate 32 to rise, until the stopping component 33 at the bottom is clipped onto the baseplate of the broom head 2. Then the clipping body 31 is disengaged from the positioning rib, whereupon rising of the baffle plate 32 is completed. The rake tooth 21 is then supported and maintains its vertical arrangement, and is prevented from bending. In this way, the rake tooth 21 has improved stability in use.

The rake tooth 21 is provided with a supporting component of a height slightly higher than that of the rake hook 22 for supporting the elastic brush head. The supporting component comprises a bracket 44 that is provided with a supporting ring 45. The elastic brush head passes through the supporting ring 45.

The supporting ring 45 is sleeved on the bristle 4 for positioning the bristle 4, such that the bristle 4 is prevented from displacement and has a stable structure in use. When the rake tooth 21 is to be used, the supporting component descends along with the rake tooth 21 and guides the brush head up and down. In this way, the brush head is prevented from spreading out even during cleaning with large force, and the brush head is robust and endurable.

The broom further comprises a scraping plate 23 that passes through the baseplate of the broom head 2. A guiding slot that matches the scraping plate 23 is provided inside the broom head 2. One end of the scraping plate 23 is connected to the second telescopic mechanism. The second telescopic mechanism drives the scraping plate 23 to move up and down.

The second telescopic mechanism comprises a second spherical bearing pair, a second adjustment rod, and a second adjustment assembly. The second adjustment rod 16 is connected to the scraping plate 23 through the second spherical bearing pair. The second adjustment assembly is connected to the second adjustment rod 16. The second adjustment assembly drives the second adjustment rod 16 to move along the broom handle 1.

The second adjustment assembly comprises a second adjustment ring 13, and a second adjustment plate 14. The second adjustment ring 13 is rotatably arranged on the broom handle 1. The second adjustment ring 13 is sleeved on the second adjustment rod 16.

The second adjustment ring 13 is threaded to the second adjustment rod. The second adjustment plate 14 has a cutout portion. The second adjustment ring 13 is rotatably arranged on the cutout portion and capable of rotating relative to the second adjustment plate 14. The second adjustment rod 16 is connected to the second adjustment plate 14.

The second telescopic mechanism is similar to the first telescopic mechanism. The second adjustment ring 13 is rotated to drive the second adjustment plate 14 to movealong the broom handle 1, and thus drives the second adjustment rod 16 connected to the second adjustment plate 14 to move. The second adjustment rod 16 is connected to the scraping plate 23 and drives the scraping plate 23 to move. In this way, quick switching is enabled between the scraping plate 23 and the elastic brush head. Such a broom has a simple structure, quick switching, and is convenient to use. It is capable of automatic telescoping depending on various conditions of ground, thereby providing more thorough cleaning and being more convenient and efficient.

The elastic brush head, scraping plate 23, and rake tooth 21 are provided to enable three different cleaning functions, that is, brushing, scraping, and raking. In this way, more thorough cleaning can be conducted in different use environments. The second telescopic mechanism and first telescopic mechanism are provided to enable automatic telescoping depending on various conditions of ground. As such, the broom provides more thorough cleaning and is more convenient and efficient.

According to the present invention, a sprinkling device may further be provided between the press plate 3 and the connection plate 43. Through adjustment to the travel of the first telescopic mechanism, the sprinkling device is pressed by the press plate 3 to sprinkle water mist. A water outlet may be arranged on a lateral side of the broom head 2 or the baseplate. The scraping plate 23 can then provide sweeping and scraping, thereby facilitating use by a user.

The embodiments described above are only preferred embodiments for thorough explanation of the present invention, and the protection scope of the present invention is not limited thereto. Equivalent substitutions or alterations made by those skilled in the art on the basis of the present invention fall within the scope of the present invention. The protection scope of the present invention is defined by the claims.

What is claimed is:

1. A multifunctional broom with a rotatable head, comprising a broom handle rotatably mounted to a broom head, wherein one or more brush heads are provided on a baseplate of the broom head, a rake tooth is also provided on the brush heads, one end of the rake tooth is provided with a rake hook, and the other end of the rake tooth extends into the broom head and is connected to the broom head via a first telescopic mechanism, and the first telescopic mechanism drives the rake tooth to extend out of or retract into the broom head; and wherein the broom handle is rotatable at an angle of 0-90° relative to the broom head.

2. The multifunctional broom with a rotatable head of claim 1, wherein the brush heads comprises a bristle, a spring, a pin rod, and a connection plate is arranged inside the broom head, the pin rod passes between the baseplate and the connection plate, the spring is sleeved over the pin rod, the bristle is fixedly connected to one end of the pin rod, and a stopper is provided on the pin rod to prevent the pin rod from being disengaged from the baseplate.

3. The multifunctional broom with a rotatable head of claim 1, wherein the first telescopic mechanism comprises a press plate, a first spherical bearing pair, a first adjustment rod, and a first adjustment assembly, the press plate is slidably arranged in a chute on an inner wall of the broom head parallel to the baseplate, the rake tooth is fixedly connected to the press plate, the first adjustment rod is connected to the press plate through the first spherical bearing pair, the adjustment assembly is arranged on the broom handle, the first adjustment assembly drives the first adjustment rod to move along the broom handle.

4. The multifunctional broom with a rotatable head of claim 3, wherein the first adjustment assembly comprises a first adjustment ring and a first adjustment plate, the first adjustment rod is connected to the first adjustment plate and the first adjustment ring is engaged threadedly with the first adjustment plate and when the first adjustment ring is turned, the first adjustment plate moves along the broom handle and thus drives the first adjustment rod to move.

5. The multifunctional broom with a rotatable head of claim 3, further comprising a baffle plate, wherein the baffle plate passes through the baseplate, the rake tooth passes through the baffle plate, and a stopping component is provided on each end of the baffle plate to prevent the baffle plate from being disengaged from the baseplate.

6. The multifunctional broom with a rotatable head of claim 5, wherein a clipping body of a U-shaped structure is provided on the press plate, and a positioning rib that matches the clipping body is provided on the stopping component.

7. The multifunctional broom with a rotatable head of claim 2, wherein the rake tooth is provided with a supporting component of a height slightly higher than that of the rake hook for supporting the brush head, the supporting component comprises a bracket that is provided with a supporting ring, and the brush head passes through the supporting ring.

8. The multifunctional broom with a rotatable head of claim 1, further comprising a scraping plate, wherein the scraping plate passes through the baseplate, a guiding slot that matches the scraping plate is provided inside the broom head, one end of the scraping plate is connected to a second telescopic mechanism, and the second telescopic mechanism drives the scraping plate to move.

9. The multifunctional broom with a rotatable head of claim 8, wherein the second telescopic mechanism comprises a second spherical bearing pair, a second adjustment rod, and a second adjustment assembly, the second adjustment rod is connected to the scraping plate through the second spherical bearing pair, the second adjustment assembly is connected to the second adjustment rod, the second adjustment assembly drives the second adjustment rod to move along the broom handle.

10. The multifunctional broom with a rotatable head of claim 9, wherein the second adjustment assembly comprises a second adjustment ring and a second adjustment plate, the second adjustment rod is connected to the second adjustment plate and the second adjustment ring is engaged threadedly with the second adjustment plate, and when the second adjustment ring is turned, the second adjustment plate moves along the broom handle and thus drives the second adjustment rod to move.

\* \* \* \* \*